Patented Jan. 7, 1941

2,227,659

UNITED STATES PATENT OFFICE 2,227,659

SULPHONATED HIGH MOLECULAR ALCOHOL

Martin Luther, Mannheim, and Wilhelm Dietrich, Ludwigshafen-on-the-Rhine, Germany, assignors, by mesne assignments, to Jasco, Incorporated, a corporation of Louisiana No Drawing. Application June 23, 1936, Serial No. 86,817. In Germany October 15, 1929

2 Claims. (Cl. 260—459)

This application is a continuation in part of our copending application Ser. No. 486,280 filed October 3, 1930, now Patent No. 2,048,662 dated July 21, 1936.

The present invention relates to a process for the sulphonation of products consisting mainly of mixtures of the higher members of the aliphatic alcohol series obtainable by hydrogenating the oxidation products of difficultly volatile hydrocarbons in the liquid phase.

In our copending applications Ser. No. 486,280 now Patent No. 2,048,662 and Ser. No. 86,816 now Patent No. 2,102,726, there is described a process for the production of products consisting mainly of mixtures of the higher members of the aliphatic alcohol series which comprises heating the products, comprising non-aromatic long-chain acids, esters and carbonyl compounds from a destructive oxidation of difficultly volatile hydrocarbons in the liquid phase by means of gaseous oxidizing agents containing free oxygen, in the presence of hydrogen and of a hydrogenating catalyst at a pressure above atmospheric pressure.

We have now found that such hydrogenation products can be advantageously employed as initial materials for the preparation of technically valuable sulphonation products. In the present case hydrogenation products can be employed which have been recovered by catalytical hydrogenation or by other reducing methods, for example by means of sodium and alcohols. The saponifiable constituents may be removed before or after the hydrogenation. The said hydrogenation products may be employed as such or after purification in usual manner, for example after distilling at normal or diminished pressure or after steam distillation. In many cases it is advantageous to employ the lower boiling fractions of the unsaponifiable products.

The sulphonation may be carried out in usual manner while employing as sulphonating agents for example sulphuric acid, oleum, sulphur trioxide or chlorosulphonic acid. In many cases it is of particular advantage to carry out the sulphonation while employing indifferent organic solvents or diluents, such as ether, carbon tetrachloride, ethylene tetrachloride, gasoline, or while adding substances which favor the sulphonation, such as phosphor pentoxide, acetic acid anhydride and the like. Generally speaking temperatures between zero and 40° C., preferably temperatures between 5° and 25° C. are employed. The sulphonation mixture obtained is introduced in ice-water and, if necessary, after removing the diluent, neutralized with caustic soda solution, sodium carbonate or other neutralizing agents, such as potassium hydroxide, alkyl amines or oxyalkylamines and then evaporated to dryness. In this manner, valuable products of white color are obtained which are advantageously suitable as wetting, cleansing and emulsifying agents.

The following examples will further illustrate how the said invention may be carried out in practice, but the invention is not restricted to these examples. The parts are by weight.

Example 1

700 parts of the neutral oxygen-containing constituents recovered from an oxidation product, which is obtained by treatment of hard paraffin wax with air at a temperature of about 160° C. and containing from about 35 to 40 per cent of oxygenated constituents having a neutral reaction, are treated for some hours in a stirring autoclave with hydrogen at 200° C. under a pressure of 30 atmospheres in the presence of finely divided metallic nickel or copper; 5 parts of hydrogen are thus absorbed. The catalyst is then filtered off. A pure white mixture consisting of higher aliphatic alcohols is obtained, which is then subjected to steam distillation. Thus a product is obtained which possesses a hydroxyl value of about 130.

100 parts of the said product are dissolved in 500 parts of carbon tetrachloride. Into this solution, there are introduced at about 10° C., while stirring, 32 parts of chlorosulphonic acid. Then stirring is continued until a sample withdrawn from the mixture is completely soluble in water. The reaction mixture is then poured on to ice and after removing the organic solvent together with the unsulphonated constituents the aqueous acid solution is neutralized with caustic soda solution. After evaporating the water a product is obtained which has a high wetting and cleansing power.

Example 2

1000 parts of an oxidation product which has been prepared by blowing paraffin oil in the presence of 1 per cent of its weight of manganese naphthenate at 160° C. with air and which contains about 35 per cent of its weight of free carboxylic acids, are subjected in an autoclave in the presence of 5 parts of nickel deposited on 15 parts of kieselguhr to the action of hydrogen at a temperature of 180° C. for 4 hours while stirring, after hydrogen has been pressed into the autoclave until a pressure of 50 atmospheres has been attained. After filtering off the catalyst the last traces of nickel are washed out from the product by means of dilute aqueous sulphuric acid.

To a solution of 100 parts of the said product in 1500 parts of dry ether are added slowly while stirring 60 parts of chlorosulphonic acid at room temperature. After the sulphonation the mixture obtained is poured on to water and ice and after separating the solvent neutralized with a 20 per cent caustic soda solution. The product thus obtained has valuable washing and wetting properties.

Example 3

1000 parts of an oxidation product prepared by blowing hard paraffin wax with air at about 160° C. are treated with hydrogen at 250° C. and 50 atmospheres pressure in an autoclave after adding 10 parts of finely divided cobalt which has been prepared by heating cobalt carbonate in a current of hydrogen at 350° C. for 36 hours. After filtering off the catalyst the product is washed with dilute aqueous sulphuric acid for removing traces of cobalt from the reaction product. After separating saponifiable constituents (free acids, lactones and esters) from the reaction product a semi-solid mixture of alcohols is obtained in a yield of 65 percent of the original oxidation product.

100 parts of said mixture are treated at from about 10° C. to 20° C. with 50 parts of sulphuric acid monohydrate while stirring until a sample of the product is practically completely soluble in water. The sulphonation product is slowly diluted with cold water and, after removing some unsulphonated constituents, neutralized with an alkaline reacting substance, such as ammonia or 20 per cent caustic soda solution. The aqueous solution is evaporated to dryness; a white powder easily soluble in water is thus obtained which possesses a high wetting and emulsifying power.

What we claim is:

1. A water-soluble product suitable as wetting, cleansing and emulsifying agent, comprising a sulphonation product of a mixture of alcohols obtainable by hydrogenating products from the destructive oxidation of difficultly volatile aliphatic hydrocarbons in the liquid phase by means of a gaseous oxidizing agent containing free oxygen.

2. A water-soluble product suitable as wetting, cleansing and emulsifying agent, comprising a sulphonation product of a mixture of alcohols having hydroxyl values between 100 and 200, the said alcohols having an average of carbon atoms between 10 and 15, obtainable by hydrogenating products from the destructive oxidation of difficultly volatile aliphatic hydrocarbons in the liquid phase by means of a gaseous oxidizing agent containing free oxygen.

MARTIN LUTHER.
WILHELM DIETRICH.